(12) United States Patent
Jeyapaul et al.

(10) Patent No.: US 12,228,459 B2
(45) Date of Patent: Feb. 18, 2025

(54) FABRY-PEROT BASED ADVANCED PNEUMATIC FIRE/OVERHEAT DETECTOR

(71) Applicant: KIDDE TECHNOLOGIES, INC., Wilson, NC (US)

(72) Inventors: Elbert Jeyapaul, Bangalore (IN); Thambiraj Avudaiappan, Kannamangala (IN)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 961 days.

(21) Appl. No.: 17/205,666

(22) Filed: Mar. 18, 2021

(65) Prior Publication Data
US 2021/0325256 A1 Oct. 21, 2021

(30) Foreign Application Priority Data
Apr. 21, 2020 (IN) .............. 202041017086

(51) Int. Cl.
*G01K 5/48* (2006.01)
*G01L 9/00* (2006.01)
*G01M 3/36* (2006.01)

(52) U.S. Cl.
CPC .............. *G01K 5/48* (2013.01); *G01L 9/0079* (2013.01); *G01M 3/36* (2013.01)

(58) Field of Classification Search
CPC .......... G01K 5/48; G01K 15/007; G01K 5/28; G01L 9/0079; G01M 3/36; G08B 17/04; G01B 2290/25; G01B 9/02; G01D 5/3512; G01J 3/26; G01J 9/0257; G01H 9/00
See application file for complete search history.

(56) References Cited

U.S. PATENT DOCUMENTS

| | | | | |
|---|---|---|---|---|
| 3,122,601 A * | 2/1964 | Williams | ................. | G01B 9/02 356/519 |
| 4,468,122 A * | 8/1984 | Puryaev | ............. | G01B 9/02039 356/513 |
| 4,933,545 A | 6/1990 | Saaski et al. | | |
| 5,128,537 A * | 7/1992 | Halg | ..................... | G01L 9/0079 250/231.19 |
| 5,212,745 A * | 5/1993 | Miller | .................. | G02B 6/3882 385/75 |
| 5,243,614 A * | 9/1993 | Wakata | ..................... | G01J 3/02 372/28 |
| 5,392,117 A * | 2/1995 | Belleville | ............ | G02B 6/4215 250/227.27 |

(Continued)

OTHER PUBLICATIONS

Extended European Search Report dated Sep. 30, 2021, received for corresponding European Application No. 21169729.7, seven pages.
(Continued)

*Primary Examiner* — Kristina M Deherrera
*Assistant Examiner* — Tania Courson
(74) *Attorney, Agent, or Firm* — Kinney & Lange, P.A.

(57) ABSTRACT

A fire or overheat detection device includes a diaphragm adjacent to a chamber with a gas inside the chamber, wherein the diaphragm contacts the gas. The fire or overheat detection system also includes a Fabry-Perot interferometer. At least a portion of the Fabry-Perot interferometer is coupled to the diaphragm via a linkage. A light source is configured to direct an input light into the Fabry-Perot interferometer.

20 Claims, 4 Drawing Sheets

(56) References Cited

U.S. PATENT DOCUMENTS

| | | | |
|---|---|---|---|
| 6,281,976 B1* | 8/2001 | Taylor | G01P 15/093 356/480 |
| 6,539,136 B1 | 3/2003 | Dianov et al. | |
| 6,577,402 B1* | 6/2003 | Miller | G01B 9/02023 356/498 |
| 6,612,174 B2* | 9/2003 | Sittler | G01L 9/0055 73/705 |
| 6,901,176 B2* | 5/2005 | Balachandran | G01D 5/35303 356/482 |
| 7,355,723 B2* | 4/2008 | Carr | H04R 23/008 356/519 |
| 7,417,743 B2* | 8/2008 | De Groot | G01B 11/2441 356/512 |
| 7,518,736 B2* | 4/2009 | Hays | G01S 17/89 356/519 |
| 7,639,368 B2* | 12/2009 | Needham | G01B 11/14 356/505 |
| 8,253,954 B2* | 8/2012 | Eguchi | H04N 1/2307 358/1.14 |
| 8,427,649 B2* | 4/2013 | Hays | G01S 17/58 356/450 |
| 8,764,678 B2* | 7/2014 | Bremer | G01L 9/0079 600/561 |
| 9,443,408 B2* | 9/2016 | Rennie | G08B 17/04 |
| 9,664,563 B2* | 5/2017 | Lucey | G01J 3/4531 |
| 9,857,221 B2* | 1/2018 | Matsushita | G01J 3/0213 |
| 10,386,245 B2 | 8/2019 | Nayak et al. | |
| 11,162,852 B1* | 11/2021 | Jeyapaul | G01L 9/0077 |
| 11,346,773 B2* | 5/2022 | Jeyapaul | G01J 3/26 |
| 11,682,282 B2* | 6/2023 | Jeyapaul | G02B 6/0208 340/630 |
| 2002/0186377 A1* | 12/2002 | Kuskovsky | G01L 9/0076 356/457 |
| 2005/0046862 A1* | 3/2005 | Melnyk | G01J 3/0218 356/480 |
| 2007/0041019 A1 | 2/2007 | Schmidt | |
| 2008/0198027 A1* | 8/2008 | Bugge | G08B 17/103 340/632 |
| 2010/0128284 A1* | 5/2010 | Riza | G01B 9/0209 356/519 |
| 2014/0266746 A1 | 9/2014 | Rennie et al. | |

OTHER PUBLICATIONS

T.W. Kao and H.F. Taylor, High-sensitivity intrinsic fiber-optic Fabry-Perot pressure sensor, Optics Letters, Apr. 15, 1996, pp. 615-617, vol. 21, No. 8, Department of Electrical Engineering, Texas A&M University, College Station, TX.

Amy F. Mielke, Kristie A. Elam, Dynamic Measurement of Temperature, Velocity, and Density in Hot Jets Using Rayleigh Scattering, Jul. 2008, 14th Int Symp on Application of Laser Techniques to Fluid Mechanics, Lisbon, Portugal, 15 pages.

Fire Protection Systems, Chapter 17, 21 pages.

* cited by examiner

FABRY-PEROT BASED ADVANCED PNEUMATIC FIRE/OVERHEAT DETECTOR

CROSS-REFERENCE TO RELATED APPLICATION(S)

This application claims priority to the application serial no. 202041017086 filed on Apr. 21, 2020, in Indian Patent Office.

BACKGROUND

The following description relates to a fire or overheat detection system, and more specifically, a fire or overheat detection system that detects when the fire or overheat detection system has a fault.

Fire or overheat detection systems are used to detect fires or overheat scenarios in engines and turbomachines. To increase the detection of potential fires or overheat scenarios, fire or overheat detection systems are strategically placed around engines. The location of the fire or overheat detection systems ensure that the fire or overheat detection systems quickly and accurately detect a fire or overheat scenario. Present fire or overheat detection systems can become contaminated resulting in false alarms in the field. Additionally, present fire or overheat detection systems are complicated in terms of manufacturing and assembly.

SUMMARY

In one aspect of the disclosure, a fire or overheat detection device includes a diaphragm adjacent a chamber with a gas inside the chamber, wherein the diaphragm contacts the gas. The fire or overheat detection system also includes a Fabry-Perot interferometer. At least a portion of the Fabry-Perot interferometer is coupled to the diaphragm via a linkage. A light source is configured to direct an input light into the Fabry-Perot interferometer.

In another aspect of the disclosure, a fire or overheat detection device includes a tube extending from a first end to a second end. The first end of the tube is closed, a diaphragm is connected to the second end and a gas is disposed inside the tube. The fire or overheat detection system also includes a light source, a first lens aligned with the light source, and a second lens aligned with the first lens. A first mirror is between the first lens and the second lens, and a second mirror is between the first mirror and the second lens. A linkage member is connected to the second mirror and the diaphragm. The first lens is between the light source and the first mirror. The fire or overheat detection system also includes an image sensor. The second lens is between the second mirror and the image sensor.

In another aspect of the disclosure, a method of operating a fire or overheat detector includes detecting a fire or overheat by expanding a gas inside a chamber to move a diaphragm adjacent the chamber in a first direction. A second mirror of a Fabry-Perot interferometer is connected to the diaphragm by a linkage member and moves in the first direction when the diaphragm moves in the first direction.

DETAILED DESCRIPTION

The present disclosure relates to a fire or overheat detection system utilizing a chamber of gas, a diaphragm, and a Fabry-Perot interferometer. The gas in the chamber expands against the diaphragm when exposed to high temperatures, causing the diaphragm to deflect in a first direction. The Fabry-Perot interferometer measures the deflection of the diaphragm in the first direction to detect fire. Should a leak occur in the chamber, the diaphragm will deflect in a second direction. The Fabry-Perot interferometer measures the deflection of the diaphragm in the second direction to detect the leak and malfunction of the fire or overheat detection system. The fire or overheat detection system will be described below with reference to FIGS. 1-4C.

Figure 1:
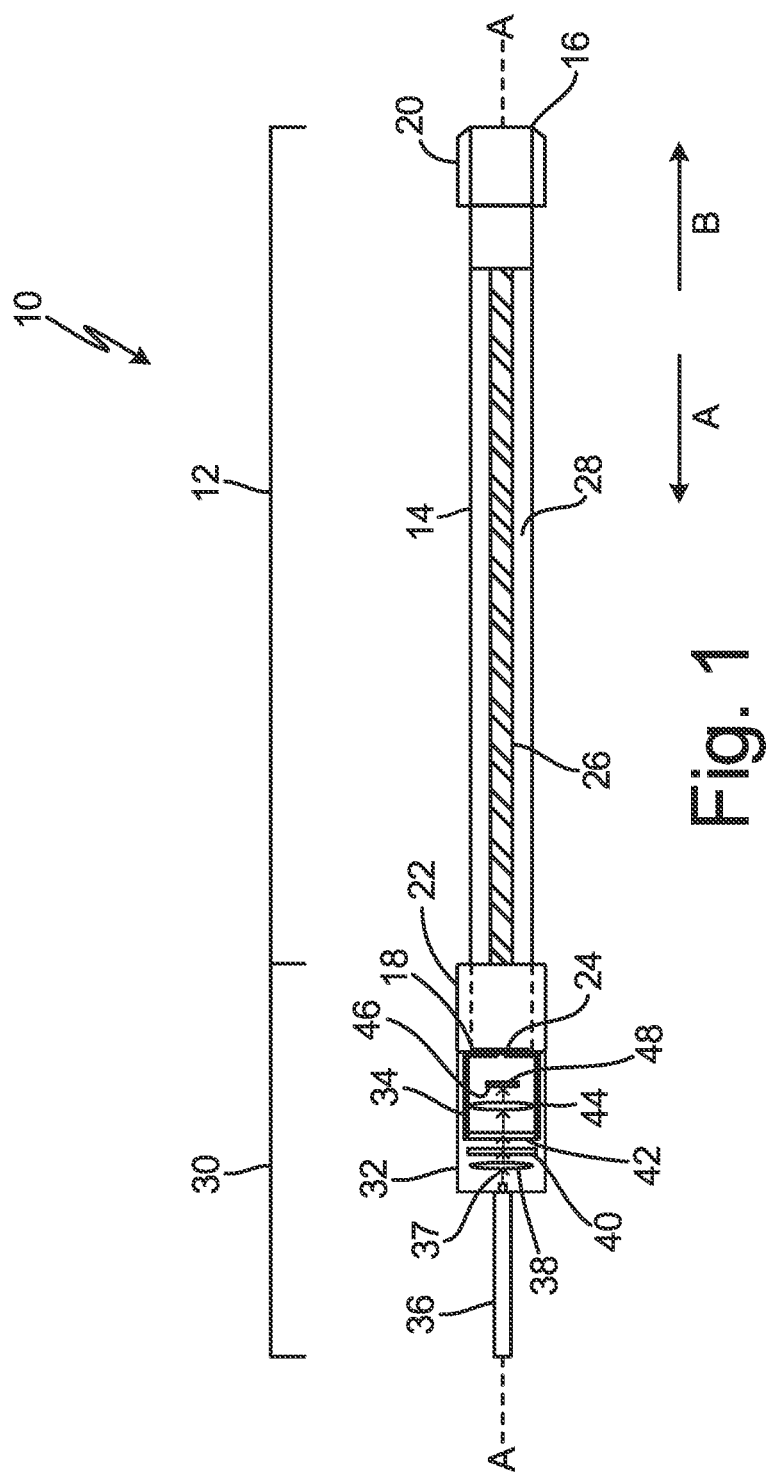
FIG. 1 is a schematic illustration of a fire or overheat detection system.

FIG. 1 is a schematic illustration of fire or overheat detection system 10. Fire or overheat detection system 10 includes pneumatic portion 12, Fabry-Perot interferometer 30, and center axis AA. Pneumatic portion 12 includes tube 14. Tube 14 includes first end 16, second end 18, cap 20, sleeve 22, diaphragm 24, hydrogen-charged core 26, and chamber 28. Fabry-Perot interferometer 30 includes enclosure 32, linkage member 34, light source 36, first lens 38, first mirror 40, second mirror 42, second lens 44, screen 46, and image sensor 48.

Tube 14 extends axially from first end 16 to second end 18. Cap 20 seals first end 16 of tube 14. Sleeve 22 is attached to second end 18 of tube 14. Sleeve 22 retains diaphragm 24. Hydrogen-charged core 26 is contained within tube 14 and is aligned axially with center axis AA. Chamber 28 surrounds hydrogen-charged core 26 within tube 14. The gas within chamber 28 is in fluid communication with diaphragm 24. In the embodiment of FIG. 1, the gas within chamber 28 is helium. In other embodiments, the gas within chamber 28 can be helium, hydrogen, or any other inert gas with a linear coefficient of thermal expansion.

Chamber 28 is charged with gas to obtain a set pressure when pneumatic portion 12 is at a pre-determined steady-state temperature. As chamber 28 is at the set pressure, diaphragm 24 is configured not to bias in either first direction A or second direction B. When the temperature of the detection environment increases, hydrogen-charged core 26 is heated. When heated, hydrogen-charged core 26 releases hydrogen gas into chamber 28. The additional hydrogen gas from hydrogen-charged core 26 increases the pressure within chamber 28. As the pressure increases within chamber 28, the pressure operates diaphragm 24 and moves diaphragm 24 to bias first direction A. As the system cools, hydrogen-charged core 26 absorbs the hydrogen gas in chamber 28, thereby decreasing the pressure within chamber 28 back to the set steady-state pressure. As the pressure within chamber 28 approaches the set pressure, diaphragm 24 moves back to a steady-state position. As discussed above, when diaphragm 24 is in a steady-state position, diaphragm 24 does not bias in first direction A nor in second direction B. If chamber 28 leaks gas, the pressure within chamber 28 decreases. As the pressure within chamber 28 decreases, diaphragm 24 actuates to bias and move in second direction B.

Figure 2:
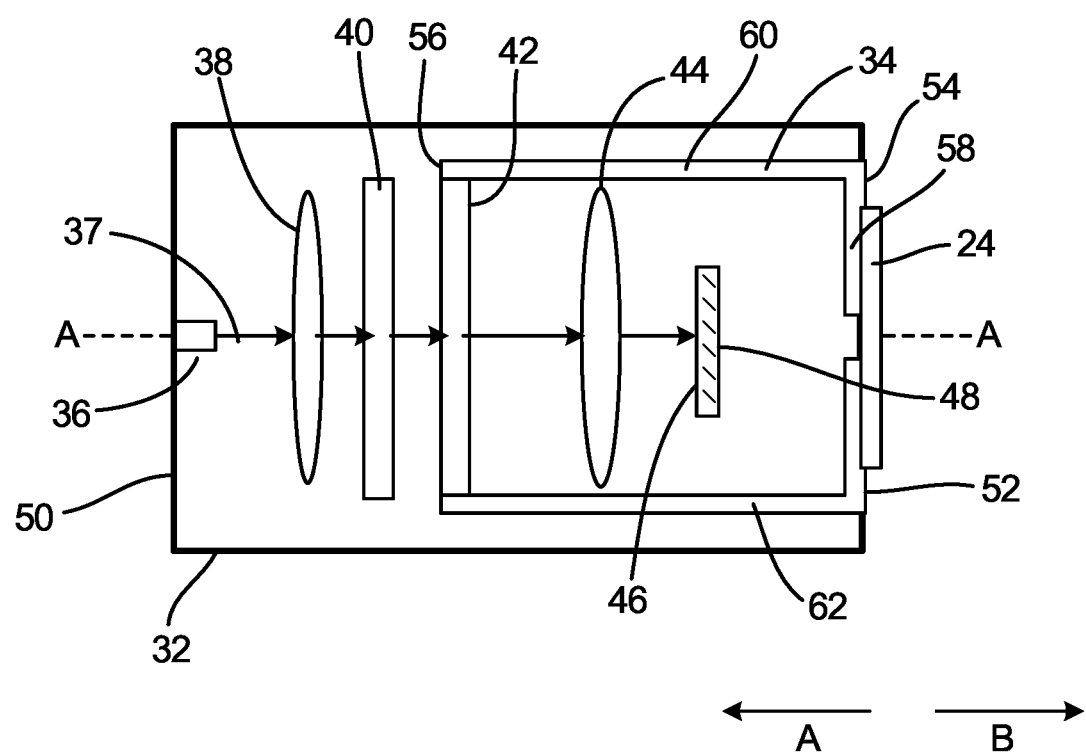
FIG. 2 is a schematic illustration of a Fabry-Perot interferometer of the fire or overheat detection system from FIG. 1.

FIG. 2 is a schematic illustration of Fabry-Perot interferometer 30. Enclosure 32 is configured to hermetically seal and insulate Fabry-Perot interferometer 30. Enclosure 32 includes first end 50 and second end 52. Light source 36 is configured to transmit incident light 37 into enclosure 32 from first end 50 toward second end 52. First lens 38 is secured within enclosure 32 so that incident light 37 transmits through center axis AA of first lens 38. First lens 38 is spaced axially from first end 50 in direction B toward second end 50. First lens 38 is between light source 36 and first mirror 40. First mirror 40 is secured within enclosure 32 and is axially spaced from first lens 38 in second direction B. First mirror 40 and first lens 38 are axially aligned about center axis AA. First mirror 40 is between first lens 38 and second mirror 42. Second mirror 42 is secured to linkage member 34 within enclosure 32. Second mirror 42, first mirror 40, and first lens 38 are axially aligned on center axis AA. Second mirror 42 is between first mirror 40 and second lens 44. Second lens 44 is secured within enclosure 32. Second lens 44, second mirror 42, first mirror 40, and first lens 38 are axially aligned on center axis AA. Second lens 44 is between second mirror 42 and screen 46. Screen 46 is secured within container 32. Screen 46 is positioned so that the interference pattern of incident light 37 transmitting through first lens 38, first mirror 40, second mirror 42, and second lens 44 is visible on screen 46. Image sensor 48 is configured to capture the interference pattern on screen 46. In the present embodiment, second mirror 42 is attached to linkage member 34. In another embodiment, second mirror 42, second lens 44, and image sensor 46 are all attached to linkage member 34.

Linkage member 34 comprises first end 54 axially opposite second end 56. Linkage member 34 includes base 58 at first end 54 and base 58 is connected to diaphragm 24. First bar 60 and second bar 62 extend axially from base 58 to second mirror 42 and connect second mirror 42 to base 58. First bar 60 is spaced radially from second bar 62 relative center axis AA. Second lens 44, screen 46, and image sensor 48 are positioned between first bar 60 and second bar 62 and positioned axially between second lens 44 and base 58.

First lens 38 and second lens 44 are configured to gather and focus incident light 37 onto first mirror 40 and screen 46, respectively. First lens 38 gathers incident light 37 provided by light source 36 and focuses incident light 37 onto first mirror 40. Second lens 44 gathers incident light 37 transmitted through second mirror 42 and focuses incident light 37 on to screen 46.

First mirror 40 and second mirror 42 are configured to transmit a set amount of incident light 37 and reflect the balance of incident light 37. First mirror 40 and second mirror 42 can be coated with a reflective coating to control the amount of light transmitted or reflected. In one embodiment, first mirror 40 and second mirror 42 can have the same coating, so that first mirror 40 and second mirror 42 each reflect the same amount of light and transmit the same amount of light. In another embodiment, first mirror 40 and second mirror 42 can each have a unique coating to control the amount of light that each mirror reflects. In the present embodiment, each of first mirror 40 and second mirror 42 reflects 60% to 99% of the light. In another embodiment, each of first mirror 40 and second mirror 42 reflects 85% to 95% of the light. In the present embodiment, first mirror 40 and second mirror 42 are rectangular prisms. In another embodiment, first mirror 40 and second mirror 42 can be slightly wedge-shaped to avoid redundant interference patterns.

Figure 3:
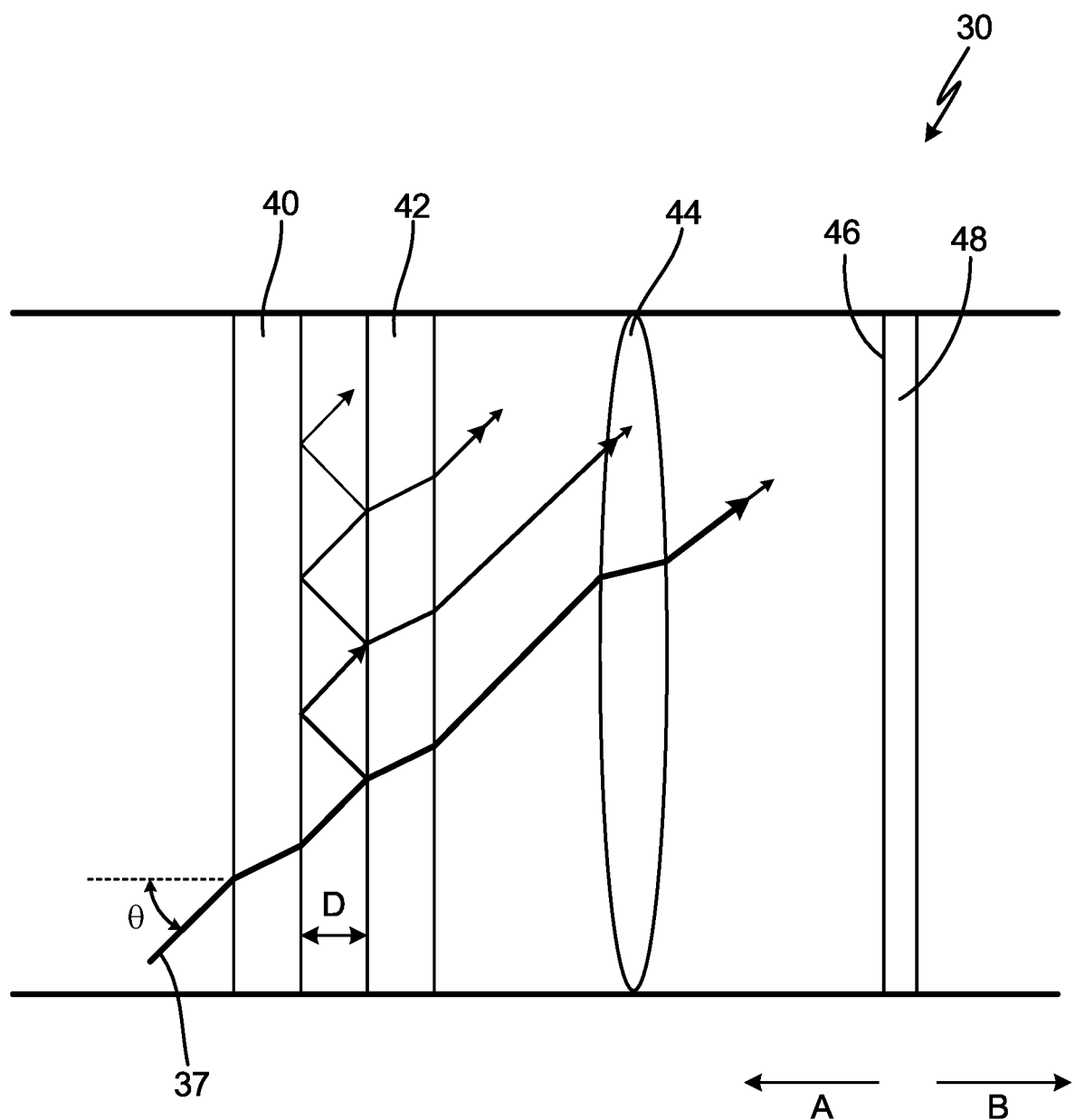
FIG. 3 is a schematic illustration showing how reflected and refracted light creates an interference pattern through the Fabry-Perot interferometer of FIG. 2.

As diaphragm 24 actuates in first direction A or second direction B, linkage member 34 and second mirror 42 also simultaneously actuate in first direction A or second direction B, respectively. As diaphragm 24, linkage member 34, and second mirror 42 actuate in first direction A, second mirror 42 moves closer to first mirror 40. As diaphragm 24, linkage member 34, and second mirror 42 move in direction B, second mirror 42 moves farther from first mirror 40. FIG. 3 is a schematic illustration showing how refracted light creates an interference pattern through a Fabry-Perot interferometer. Fabry-Perot interferometer 30 includes incident angle θ and mirror spacing D.

As shown in FIG. 3, incident light 37 contacts first mirror 40 at incident angle θ, and a portion of incident light 37 is reflected off the surface of first mirror 40 at an angle equal to incident angle θ. The light that does not reflect off first mirror 40 transmits through first mirror 40. As the light transmits through first mirror 40, the light refracts due to the refractive index of first mirror 40. As the transmitted light leaves first mirror 40, the angle of the transmitted light is equal to incident angle θ of incident light 37 as entered into first mirror 40. The transmitted light then hits second mirror 42 at incident angle θ, and a set amount of incident light 37 would reflect off second mirror 42. Incident light 37 that does not reflect off second mirror 42 would transmit through second mirror 42. Incident light 37 that transmits second mirror 42 would refract according to the refractive index of second mirror 42. Incident light 37 that reflects off of second mirror 42 would reflect back to first mirror 40. As incident light 37 reflects back to first mirror 40, incident light 37 contacts first mirror 40 at incident angle θ. Incident light 37 then reflects off first mirror 40 and back toward second mirror 42.

The reflection of incident light 37 between first mirror 40 and second mirror 42 is an iterative process. The iterative process of incident light 37 reflecting between first mirror 40 and second mirror 42 generates an interference pattern depicted on screen 46. The interference pattern on screen 46 is then captured by image sensor 48. As second mirror 42 moves in first direction A or second direction B, mirror spacing D, the distance between first mirror 40 and second mirror 42, is changed. As a result of the change in mirror spacing D, the interference pattern depicted on screen 46 and captured by image sensor 48 changes. The interference pattern is discussed below with reference to FIGS. 4A-4C.

Figure 4A:
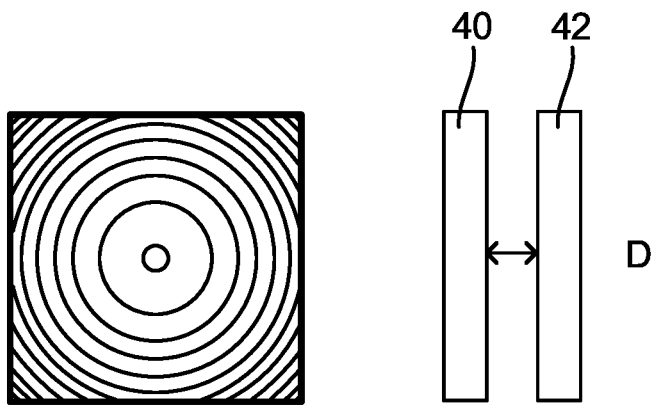
FIG. 4A is a schematic illustration showing a typical interference pattern during normal operating conditions.

FIG. 4A is a schematic illustration showing a typical interference pattern during normal operating conditions at desirable temperatures. First mirror 40 and second mirror 42 are spaced at normal operating mirror spacing D as diaphragm 24 is showing no bias in first direction A or second direction B. Fire or overheat detection system 10 is calibrated to recognize the number of bands and the spacing between the bands in the interference pattern of FIG. 4A as a normal operating condition.

Figure 4B:
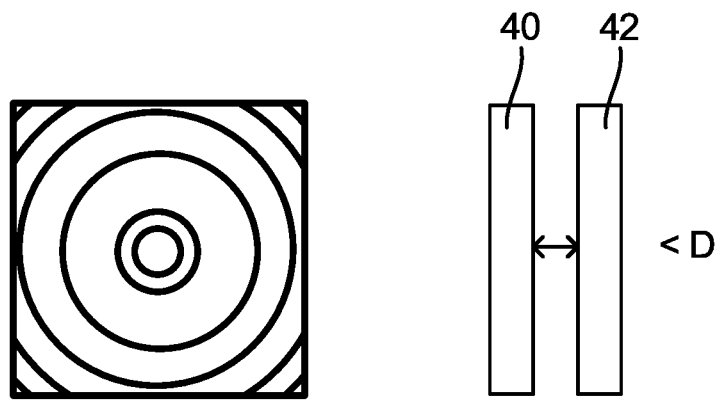
FIG. 4B is a schematic illustration showing a typical interference pattern during fire or overheat operating conditions.

FIG. 4B is a schematic illustration showing a typical interference pattern during fire or high heat operating conditions. When a fire or high heat occurs proximate fire or overheat detection system 10, heat is transferred into chamber 24 and causes the pressure inside chamber 24 to increase. As pressure builds in chamber 24, diaphragm 24 deflects and moves in first direction A. As diaphragm 24 moves in first direction A, linkage member 34 and second mirror 42 also move in first direction A. As a result of second mirror 42 moving in first direction A, the distance between first mirror 40 and second mirror 42 is less than normal operating mirror spacing D. The decreased distance between first mirror 40 and second mirror 42 decreases the instances of reflection of incident light 37 between first mirror 40 and second mirror 42, which decreases the number of bands to produce the interference pattern of FIG. 4B. Fire or overheat detection system 10 is calibrated to recognize the decrease in the number of bands as a leak or fault condition.

Figure 4C:
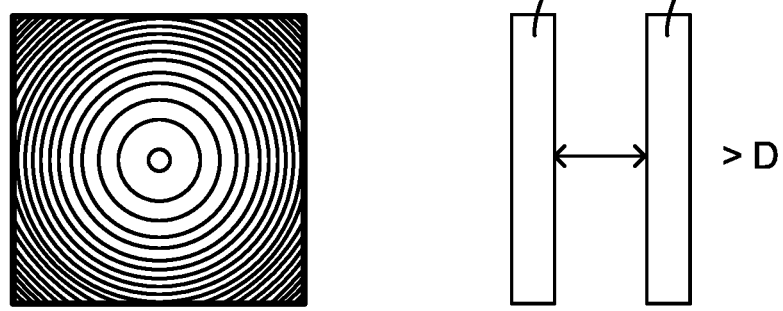
FIG. 4C is a schematic illustration showing a typical interference pattern during a leak or fire or overheat detection system fault.

FIG. 4C is a schematic illustration showing a typical interference pattern during a leak or fire or overheat detection system fault. When a leak occurs in chamber 24, gas exits chamber 24 and the pressure inside chamber 24 drops below the steady state pressure. As pressure decreases below steady-state pressure in chamber 24, diaphragm 24 deflects and moves in second direction B. As diaphragm 24 actuates in second direction B, linkage member 34 and second mirror 42 also actuate in second direction B. As a result of second mirror 42 moving in first direction A, the distance between first mirror 40 and second mirror 42 is greater than normal operating mirror spacing D. The increased distance between first mirror 40 and second mirror 42 increases the instances of reflection of incident light 37 between first mirror 40 and second mirror 42, which increases the number of bands to produce the interference pattern of FIG. 4C. Fire or overheat detection system 10 is calibrated to recognize the increase in the number of bands as a fire or overheat condition.

Discussion of Possible Embodiments

The following are non-exclusive descriptions of possible embodiments of the present invention.

In one aspect of the disclosure, a fire or overheat detection device includes a diaphragm adjacent a chamber with a gas inside the chamber, wherein the diaphragm contacts the gas. The fire or overheat detection system also includes a Fabry-Perot interferometer. At least a portion of the Fabry-Perot interferometer is coupled to the diaphragm via a linkage. A light source is configured to direct an input light into the Fabry-Perot interferometer.

The fire or overheat detection device of the preceding paragraph can optionally include, additionally and/or alternatively, any one or more of the following features, configurations and/or additional components:

wherein the chamber comprises: a tube extending between a first end and a second end; a hydrogen-charged core inside the tube; an end cap connected to the first end of the tube; and a sleeve connected to the second end of the tube, wherein the diaphragm is held within the sleeve;

wherein the hydrogen-charged core is configured to release hydrogen from the hydrogen-charged core when the hydrogen-charged core increases in temperature;

wherein the hydrogen-charged core is configured to absorb hydrogen when the hydrogen-charged core decreases in temperature;

wherein the gas comprises helium wherein the gas comprises at least one of helium and hydrogen; and/or wherein the Fabry-Perot interferometer includes: a first lens, secured within the Fabry-Perot interferometer; a first mirror, secured within the Fabry-Perot interferometer, and axially aligned with the first lens relative a center axis, and wherein the first lens is axially between the light source and the first mirror; a second mirror, coupled to the linkage, and axially aligned with the first lens and the first mirror relative the center axis; a second lens, secured within the Fabry-Perot interferometer, and axially aligned with the first lens, the first mirror, and the second mirror, wherein the first mirror and the second mirror are both axially between the first lens and the second lens, and wherein the second lens is configured to focus the transmitted light onto a screen; and an image sensor secured within the Fabry-Perot interferometer and configured to capture the transmitted light that is focused on the screen, wherein the second lens is axially between the second mirror and the screen.

In another aspect of the disclosure, a fire or overheat detection device includes a tube extending from a first end to a second end. The first end of the tube is closed, a diaphragm is connected to the second end and a gas is disposed inside the tube. The fire or overheat detection system also includes a light source, a first lens aligned with the light source, and a second lens aligned with the first lens. A first mirror is between the first lens and the second lens, and a second mirror is between the first mirror and the second lens. A linkage member is connected to the second mirror and the diaphragm. The first lens is between the light source and the second lens. The fire or overheat detection system also includes an image sensor. The second lens is between the second mirror and the image sensor.

The fire or overheat detection device of the preceding paragraph can optionally include, additionally and/or alternatively, any one or more of the following features, configurations and/or additional components:

further comprising: a hydrogen-charged core within the tube, wherein the hydrogen-charged core is configured to release hydrogen from the hydrogen-charged core when the hydrogen-charged core increases in temperature, and wherein the hydrogen-charged core is configured to absorb hydrogen when the hydrogen-charged core decreases in temperature;

wherein the tube, the first lens, the second lens, the first mirror, the second mirror, the light source, and the image sensor are all axially aligned along a center axis;

further comprising: an enclosure connected to the tube that hermetically seals and insulates the first mirror, the second mirror, the first lens, the second lens, and the linkage member;

wherein the first lens and the first mirror are connected to the enclosure and are stationary relative to the second mirror and the linkage member;

wherein the second lens and the image sensor are stationary relative to the second mirror and the linkage member;

wherein the gas comprises a linear coefficient of thermal expansion;

wherein the gas comprises helium; and/or wherein the gas comprises at least one of helium and hydrogen.

In another aspect of the disclosure, a method of operating a fire or overheat detector includes detecting a fire or overheat by expanding a gas inside a chamber to move a diaphragm adjacent the chamber in a first direction. A second mirror of a Fabry-Perot interferometer is connected to the diaphragm by a linkage member and moves in the first direction when the diaphragm moves in the first direction.

The fire or overheat detection device of the preceding paragraph can optionally include, additionally and/or alternatively, any one or more of the following features, configurations and/or additional components:

further comprising: capturing via an image sensor, a change in a light provided by a light source, wherein the change in the light is caused by changes in refraction as the light transmits through the Fabry-Perot interferometer; and alerting that a fire or an overheat scenario may be present;

further comprising: detecting a leakage in the chamber by moving the diaphragm in a second direction, wherein the second mirror of the Fabry-Perot interferometer is connected to the diaphragm by the linkage member and moves in the second direction when the diaphragm moves in the second direction; and/or further comprising: capturing via an image sensor, a change in a light provided by a light source, wherein the change in the light is caused by changes in refraction as the light transmits through the Fabry-Perot interferometer; and alerting that there may be a gas leak in the fire or overheat detection system.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, hydrogen-charged core 26 can be made of titanium or any other material that releases hydrogen gas as temperature increases and absorbs hydrogen when the material temperature is decreased. Therefore, it is intended that the invention not be limited to the particular embodiment(s) disclosed, but that the invention will include all embodiments falling within the scope of the appended claims.

The invention claimed is:

1. A fire or overheat detection device comprising:
a chamber; a gas and a gas charged core within the chamber; a diaphragm adjacent the chamber, wherein the diaphragm contacts the gas;
a Fabry-Perot interferometer, wherein at least a portion of the Fabry-Perot interferometer is coupled to the diaphragm via a linkage;
a light source configured to direct an input light into the Fabry-Perot interferometer; and
wherein the diaphragm, the chamber, the gas charged core, the Fabry-Perot interferometer, and the light source are all axially aligned along a center axis.

2. The fire or overheat detection device of claim 1, wherein the gas comprises helium.

3. The fire or overheat detection device of claim 1, wherein the gas comprises at least one of helium and hydrogen.

4. The fire or overheat detection device of claim 1, wherein the chamber comprises:
a tube extending between a first end and a second end;
an end cap connected to the first end of the tube; and
a sleeve connected to the second end of the tube, wherein the diaphragm is held within the sleeve
wherein the gas charged core is a hydrogen-charged core.

5. The fire or overheat detection device of claim 4, wherein the hydrogen-charged core is configured to release hydrogen from the hydrogen-charged core when the hydrogen-charged core increases in temperature.

6. The fire or overheat detection device of claim 4, wherein the hydrogen-charged core is configured to absorb hydrogen when the hydrogen-charged core decreases in temperature.

7. The fire or overheat detection device of claim 4, wherein the Fabry-Perot interferometer comprises:
a first lens, secured within the Fabry-Perot interferometer;
a first mirror, secured within the Fabry-Perot interferometer, and axially aligned with the first lens relative a center axis, and wherein the first lens is axially between the light source and the first mirror;
a second mirror, coupled to the linkage, and axially aligned with the first lens and the first mirror relative the center axis;
a second lens, secured within the Fabry-Perot interferometer, and axially aligned with the first lens, the first mirror, and the second mirror, wherein the first mirror and the second mirror are both axially between the first lens and the second lens, and wherein the second lens is configured to focus the transmitted light onto a screen; and
an image sensor secured within the Fabry-Perot interferometer and configured to capture the transmitted light that is focused on the screen, wherein the second lens is axially between the second mirror and the screen.

8. A fire or overheat detection device comprising:
a tube extending from a first end to a second end, wherein the first end is closed;
a diaphragm connected to the second end;
a gas charged core within the tube;
a gas disposed within the tube;
a light source outside of the tube and directed toward the diaphragm;
a first lens aligned with the light source;
a second lens aligned with the first lens, wherein the first lens is between the light source and the second lens;
a first mirror between the first lens and the second lens;
a second mirror between the first mirror and the second lens;
an image sensor, wherein the second lens is between the second mirror and the image sensor; and
a linkage member connected to the second mirror and to the diaphragm.

9. The fire or overheat detection device of claim 8, further comprising:
wherein the gas charged core is a hydrogen-charged core, wherein the hydrogen-charged core is configured to release hydrogen from the hydrogen-charged core when the hydrogen-charged core increases in temperature, and wherein the hydrogen-charged core is configured to absorb hydrogen when the hydrogen-charged core decreases in temperature.

10. The fire or overheat detection device of claim 8, wherein the tube, the first lens, the second lens, the first mirror, the second mirror, the light source, and the image sensor are all axially aligned along a center axis.

11. The fire or overheat detection device of claim 8, wherein the gas comprises a linear coefficient of thermal expansion.

12. The fire or overheat detection device of claim 8, wherein the gas comprises helium.

13. The fire or overheat detection device of claim 8, wherein the gas comprises at least one of helium and hydrogen.

14. The fire or overheat detection device of claim 8 further comprising:
an enclosure connected to the tube that hermetically seals and insulates the first mirror, the second mirror, the first lens, the second lens and the linkage member.

15. The fire or overheat detection device of claim 14, wherein the first lens and the first mirror are connected to the enclosure and are stationary relative to the second mirror and the linkage member.

16. The fire or overheat detection device of claim 14, wherein the second lens and the image sensor are stationary relative to the second mirror and the linkage member.

17. A method of operating a fire or overheat detector, the method comprising:
providing a chamber and a gas charged core within the chamber; and detecting a fire or an overheat by releasing a gas from the gas charged core within the chamber to move a diaphragm adjacent the chamber in a first direction, wherein a second mirror of a Fabry-Perot interferometer is connected to the diaphragm by a linkage member and moves in the first direction when the diaphragm moves in the first direction toward a first mirror that remains static.

18. The method of claim 17, further comprising:
capturing via an image sensor located between the second mirror and the diaphragm, a change in a light provided by a light source that is directed in a second direction toward the first mirror, the second mirror, and the image sensor, wherein the change in the light is caused by changes in refraction as the light transmits through the Fabry-Perot interferometer; and
alerting that a fire or an overheat scenario may be present.

19. The method of claim 17, further comprising:
detecting a leakage in the chamber by moving the diaphragm in a second direction, wherein the second mirror of the Fabry-Perot interferometer is connected to the diaphragm by the linkage member and moves in the second direction when the diaphragm moves in the second direction.

20. The method of claim 19, further comprising:
capturing via an image sensor located between the second mirror and the diaphragm, a change in a light provided by a light source that is directed in a second direction toward the first mirror, the second mirror, and the image sensor, wherein the change in the light is caused by changes in refraction as the light transmits through the Fabry-Perot interferometer; and
alerting that there may be a gas leak in the fire or overheat detector.

* * * * *